United States Patent
Ehsan et al.

(10) Patent No.: US 9,386,128 B2
(45) Date of Patent: Jul. 5, 2016

(54) DELAY BASED ACTIVE QUEUE MANAGEMENT FOR UPLINK TRAFFIC IN USER EQUIPMENT

(75) Inventors: Navid Ehsan, San Diego, CA (US); Thomas Klingenbrunn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/428,954

(22) Filed: Mar. 23, 2012

(65) Prior Publication Data

US 2013/0250765 A1    Sep. 26, 2013

(51) Int. Cl.
| | |
|---|---|
| *H04L 1/00* | (2006.01) |
| *G06F 21/52* | (2013.01) |
| *H04J 3/24* | (2006.01) |
| *H04W 72/00* | (2009.01) |
| *G06F 15/16* | (2006.01) |
| *G06F 3/00* | (2006.01) |
| *G06F 5/14* | (2006.01) |
| *H04L 29/06* | (2006.01) |
| *H04L 12/825* | (2013.01) |

(Continued)

(52) U.S. Cl.
CPC ............ *H04L 69/163* (2013.01); *H04L 47/193* (2013.01); *H04L 47/25* (2013.01); *H04L 47/283* (2013.01); *H04L 47/14* (2013.01); *H04L 47/323* (2013.01); *H04L 47/326* (2013.01); *H04W 80/06* (2013.01)

(58) Field of Classification Search
CPC ....... H04L 47/10; H04L 12/569; H04L 28/02; H04L 47/12; H04L 47/14; H04L 69/163; H04L 47/25; H04L 47/193; H04L 47/283; H04L 47/323; H04L 47/326; H04W 28/10
USPC ......... 370/310, 230, 252, 231, 235, 469, 389, 370/241, 326, 345, 465, 236, 330, 336, 229, 370/412; 709/235, 232; 710/452
See application file for complete search history.

(56) References Cited

U.S. PATENT DOCUMENTS 7,266,613 B1 *   9/2007   Brown et al. .................. 709/235
7,349,330 B1 *   3/2008   Hayakawa et al. ............ 370/229

(Continued)

FOREIGN PATENT DOCUMENTS

EP            1876779 A2 *   1/2008

OTHER PUBLICATIONS

G. Thiruchelvi et al., "A survey on Active Queue Management Mechanisms", IJCSNS International Journal of Computer Science and Network Security, vol. 8 No. 12, Dec. 2008, pp. 130-145.

(Continued)

*Primary Examiner* — Alpus H Hsu
*Assistant Examiner* — Camquyen Thai
(74) *Attorney, Agent, or Firm* — LInda G. Gunderson (57) ABSTRACT

A method, an apparatus, and a computer program product for wireless communication are provided. The apparatus stores data packets in a buffer. In addition, the apparatus determines a delay of at least one data packet of the data packets in the buffer. Furthermore, the apparatus controls a TCP data flow rate based on the determined delay. The apparatus may also store ACKs in a second buffer and drop an ACK of the stored ACKs when one of a number of stored ACKs is greater than a first threshold or a size of the stored ACKs is greater than a second threshold.

48 Claims, 9 Drawing Sheets

(51) Int. Cl.
*H04L 12/841* (2013.01)
*H04W 80/06* (2009.01)
*H04L 12/823* (2013.01)
*H04L 12/801* (2013.01)

(56) References Cited

U.S. PATENT DOCUMENTS

| | | | |
|---|---|---|---|
| 7,349,337 B1* | 3/2008 | Mahdavi | 370/230.1 |
| 7,801,038 B2* | 9/2010 | Liao et al. | 370/230.1 |
| 8,107,369 B2* | 1/2012 | Sagfors | 370/230 |
| 8,155,074 B1* | 4/2012 | Vargantwar | H04W 72/1221 370/328 |
| 8,593,959 B2* | 11/2013 | Hepworth et al. | 370/231 |
| 2003/0088690 A1* | 5/2003 | Zuckerman et al. | 709/232 |
| 2003/0179720 A1* | 9/2003 | Cuny | 370/310 |
| 2005/0088976 A1* | 4/2005 | Chafle et al. | 370/252 |
| 2005/0213507 A1* | 9/2005 | Banerjee et al. | 370/241 |
| 2005/0262266 A1* | 11/2005 | Wiberg et al. | 709/238 |
| 2006/0268708 A1* | 11/2006 | Speight et al. | 370/235 |
| 2007/0121523 A1* | 5/2007 | Morandin | H04J 3/0682 370/252 |
| 2008/0089250 A1* | 4/2008 | Jung | 370/276 |
| 2008/0175147 A1* | 7/2008 | Lakkakorpi | 370/230 |
| 2008/0253314 A1* | 10/2008 | Stephenson et al. | 370/326 |
| 2009/0245223 A1* | 10/2009 | Godfrey | 370/345 |
| 2010/0020686 A1 | 1/2010 | Lee et al. | |
| 2010/0074111 A1* | 3/2010 | Krishnaprasad et al. | 370/231 |
| 2010/0097930 A1 | 4/2010 | Racz et al. | |
| 2010/0098047 A1* | 4/2010 | Zhou et al. | 370/345 |
| 2010/0309788 A1 | 12/2010 | Ho et al. | |
| 2011/0090795 A1 | 4/2011 | Li et al. | |
| 2011/0110230 A1* | 5/2011 | Zhuang | 370/230 |
| 2012/0039169 A1* | 2/2012 | Susitaival et al. | 370/230 |
| 2012/0147750 A1* | 6/2012 | Pelletier | H04W 28/02 370/235 |
| 2013/0083654 A1* | 4/2013 | Lee et al. | 370/230 |

OTHER PUBLICATIONS

International Search Report and Written Opinion—PCT/US2013/033194—ISA/EPO—Jun. 25, 2013.
Taiwan Search Report—TW102110312—TIPO—Jan. 20, 2015.

* cited by examiner

No Delayed ACKs

| UL Buffer Size (KBytes) | DL Rate $R_D$ (Mbps) | UL Rate $R_U$ (Mbps) |
|---|---|---|
| 10 | 9.9 | 0.843 |
| 20 | 9.5 | 1.223 |
| 25 | 6.4 | 1.576 |
| 30 | 5.6 | 1.661 |
| 40 | 4.1 | 1.797 |
| 50 | 3.7 | 1.806 |
| 80 | 2.5 | 1.826 |
| 100 | 2.2 | 1.841 |

Delayed ACKs

| UL Buffer Size (KBytes) | DL Rate $R_D$ (Mbps) | UL Rate $R_U$ (Mbps) |
|---|---|---|
| 10 | 12.6 | 0.766 |
| 20 | 11.2 | 1.137 |
| 30 | 5.4 | 1.728 |
| 40 | 6.1 | 1.797 |
| 50 | 4.8 | 1.818 |
| 80 | 3.2 | 1.848 |
| 100 | 3.1 | 1.848 |

DELAY BASED ACTIVE QUEUE MANAGEMENT FOR UPLINK TRAFFIC IN USER EQUIPMENT

BACKGROUND

1. Field

The present disclosure relates generally to communication systems, and more particularly, to delay based active queue management for uplink traffic in user equipment (UE).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). These multiple access technologies have been adopted in various telecommunication standards to provide a common protocol that enables different wireless devices to communicate on a municipal, national, regional, and even global level. Examples of telecommunication standards are Evolved High-Speed Packet Access (also known as HSPA+) and Long Term Evolution (LTE).

In HSPA+, LTE, and other telecommunication standards, multiple applications may share the same modem and communication inefficiencies may result due to increased queuing of data and acknowledgments (ACKs). To address potential communication inefficiencies, a flow control algorithm is needed.

SUMMARY

In an aspect of the disclosure, a method, a computer program product, and an apparatus are provided. The apparatus stores data packets in a buffer. In addition, the apparatus determines a delay of at least one data packet of the data packets in the buffer. Furthermore, the apparatus controls a Transmission Control Protocol (TCP) data flow rate based on the determined delay.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 1:
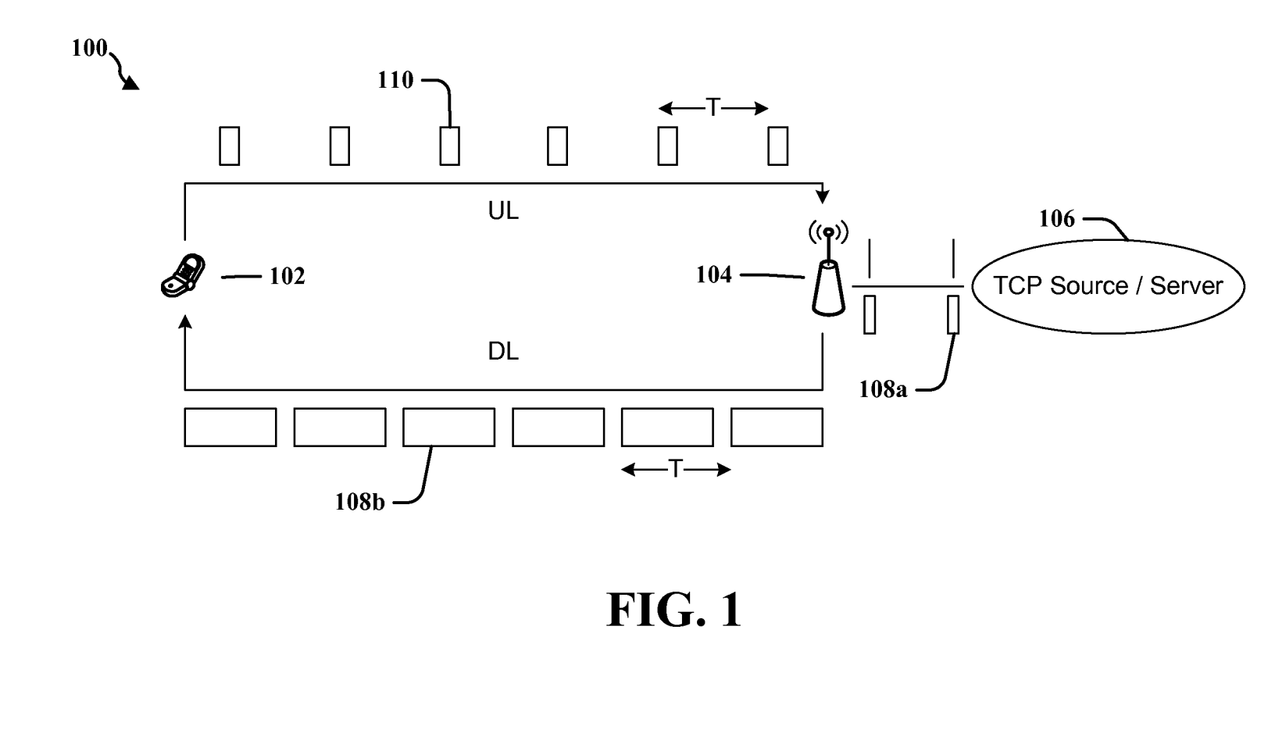
FIG. 1 is a first diagram for illustrating TCP communication between a UE and a TCP source/server.

FIG. 1 is a first diagram 100 for illustrating TCP communication between a UE 102 and a TCP source/server 106. The UE 102 communicates with the TCP source/server 106 via the evolved Node B (eNB) 104. The TCP source/server 106 is located somewhere on the Internet and therefore the TCP source/server 106 may not be directly connected to the eNB 104. As shown in FIG. 1, the eNB 104 receives TCP data packets 108a from the TCP source/server 106 and transmits those data packets 108b to the UE 102. The data packets 108b are spaced apart by time T, where $T=MSS/R_D$, MSS is the maximum segment size, and $R_D$ is the downlink (DL) rate. The UE 102 receives the data packets 108b, processes the data packets 108b, and sends ACKs 110 back to the eNB 104. The ACKs 110 are also spaced apart by time T, irrespective of the uplink (UL) rate $R_U$. The equal spacing of the ACKs 110 on UL and the data packets 108b on DL enables TCP without causing buffer over-flows.

Figure 2:
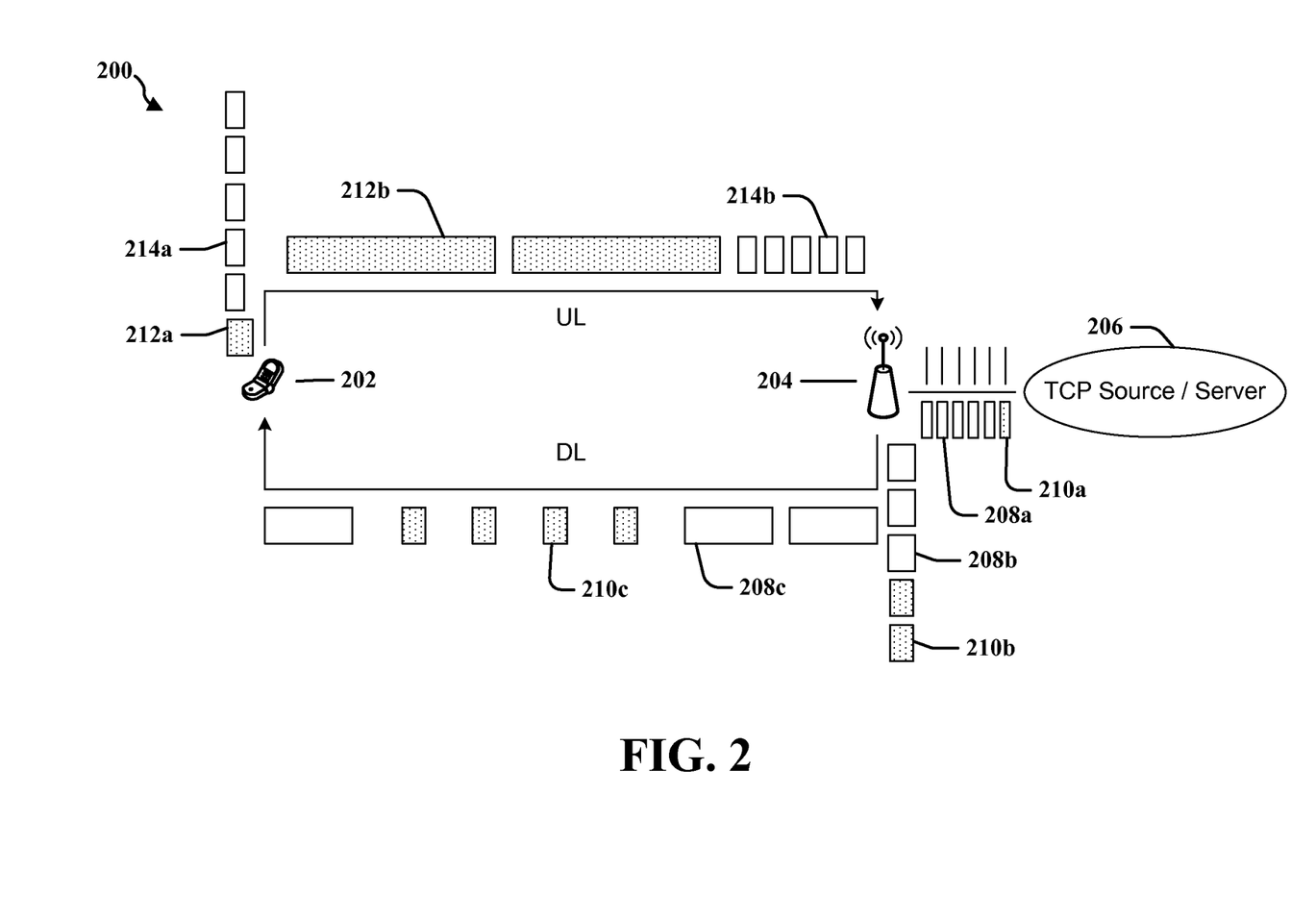
FIG. 2 is a second diagram for illustrating TCP communication between a UE and a TCP source/server.

FIG. 2 is a second diagram 200 for illustrating TCP communication between a UE 202 and a TCP source/server 206. The UE 202 communicates with the TCP source/server 206 via the eNB 204. The TCP source/server 206 is located somewhere on the Internet and therefore the TCP source/server 206 may not be directly connected to the eNB 204. As shown in FIG. 2, the eNB 204 receives TCP data packets 208a and ACKs 210a from the TCP source/server 206. The data packets 208b and ACKs 210b are queued in a buffer for transmission. The eNB 204 de-queues the data packets 208b and ACKs 210b and transmits the data packets 208c and ACKs 210c to the UE 202. The UE 202 receives the data packets 208c, processes those data packets 208c, and queues ACKs 214a for transmission to the eNB 204. The UE 202 also queues data packets 212a for transmission to the eNB 204. The UE 202 de-queues the data packets 212a and the ACKs 214a and transmits the data packets 212b and the ACKs 214b to the eNB 204. The ACKs 214b are spaced really close together. Such close spacing may be referred to as ACK compression (also referred to as ACK aggregation). Due to ACK compression, the TCP source/server 206 receives a plurality of ACKs at almost the same time. When the TCP source/server 206 receives a plurality of ACKs with less time spacing than the spacing in which data packets are transmitted, the TCP source/server 206 may be misled into sending more data than the network can accept. As such, the TCP source/server 206 may increase the rate at which data packets 208a are provided to the eNB 204. As a result, the UE 202 may receive an increased amount of data packets 208c on DL, and queue an increased number of ACKs 214a and data packets 212a for UL transmission. The increased number of ACKs 214a and data packets 212a queued for UL transmission causes additional ACK compression, and increased TCP communication inefficiencies such as dropped packets and/or increases in the round trip time (RTT). The RTT refers to the total time from when a data packet leaves the TCP source/server 206 to the time when the TCP source/server 206 receives a corresponding ACK. Due to the increased RTT, the TCP congestion window size must grow large to allow full usage of the bandwidth. The number of bytes that can be outstanding at any one time is a function of the TCP congestion window size. The TCP congestion window cannot grow beyond the buffering capability on the network side due to ACK compression. The combination of a large RTT and ACK compression results in low throughput for TCP.

Figure 3:
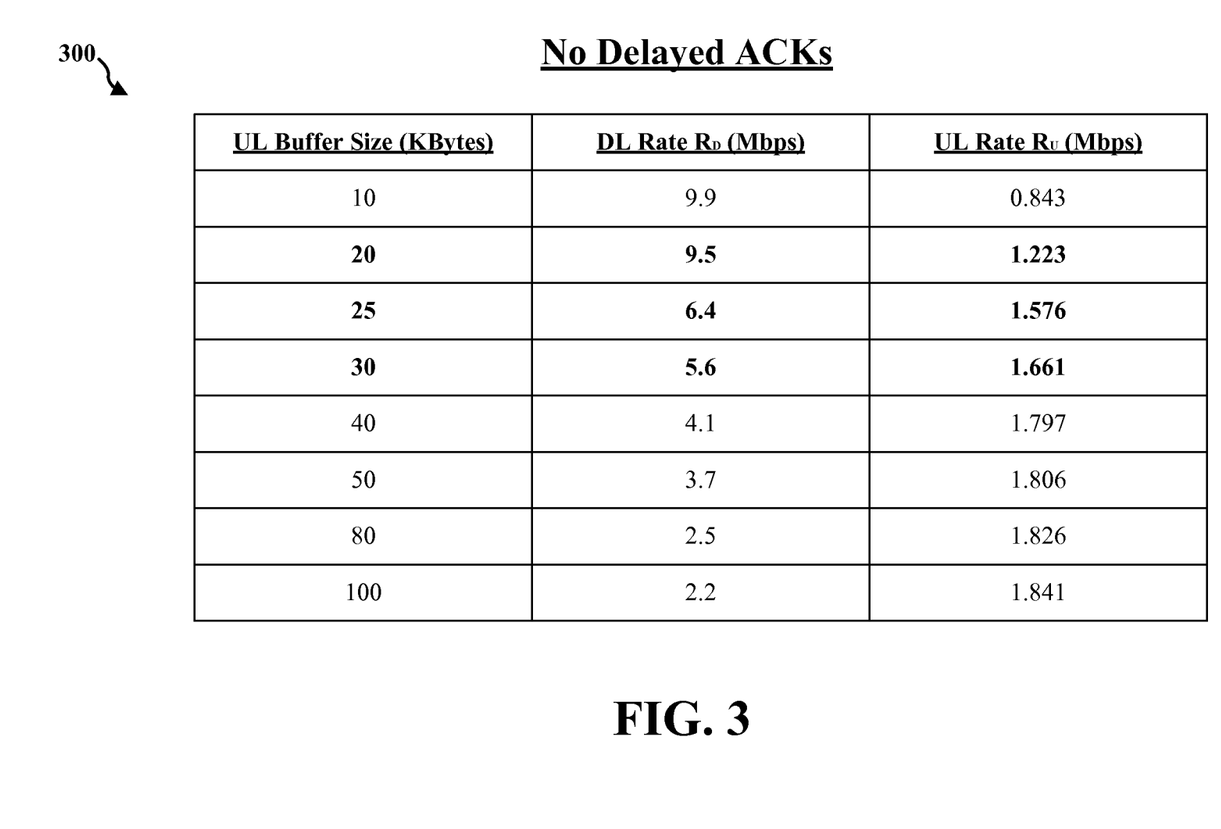
FIG. 3 is a diagram for illustrating a downlink rate and an uplink rate for various uplink buffer sizes without delayed ACKs.
Figure 4:
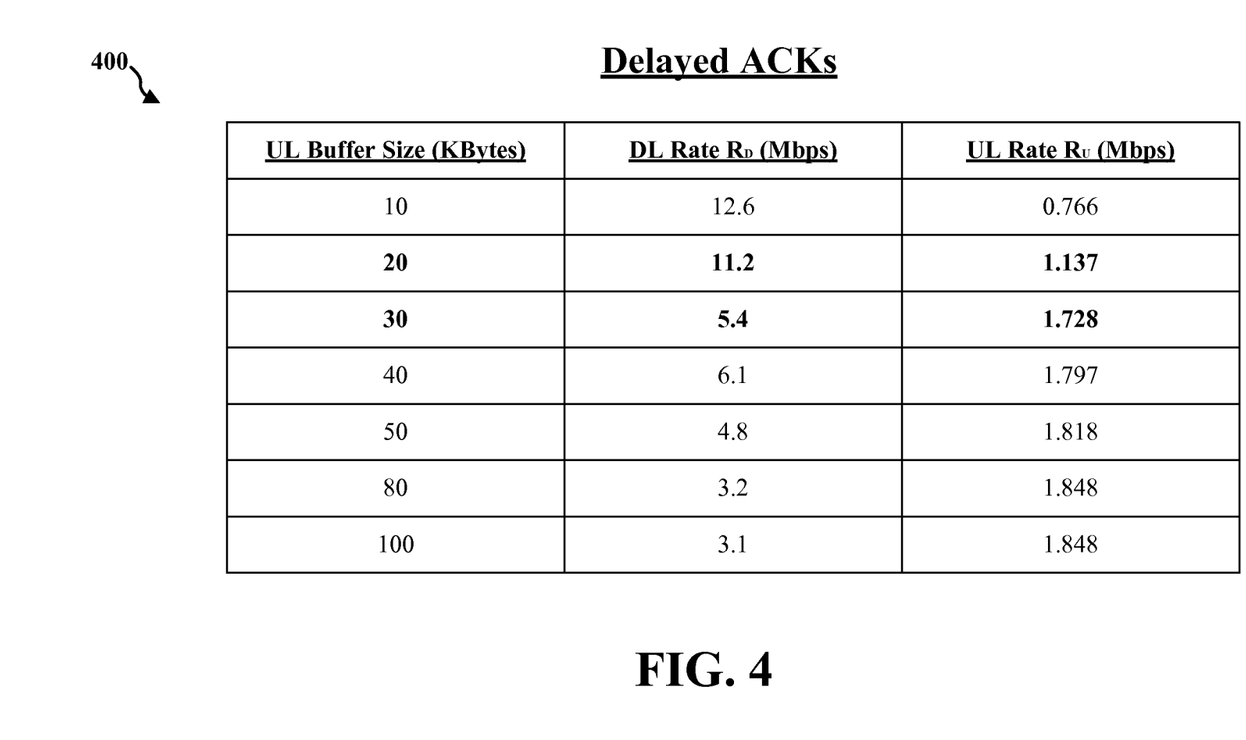
FIG. 4 is a diagram for illustrating a downlink rate and an uplink rate for various uplink buffer sizes with delayed ACKs.

FIG. 3 is a diagram 300 for illustrating a DL rate $R_D$ and an UL rate $R_U$ for various UL buffer sizes without delayed ACKs. FIG. 4 is a diagram 400 for illustrating a DL rate $R_D$ and an UL rate $R_U$ for various UL buffer sizes with delayed ACKs. The rates were determined assuming a 100 Mbps link with a 40 ms delay between the TCP source/server and the eNB, a 14 Mbps DL rate with a 1 ms delay from the eNB to the modem of the UE, a 2 Mbps UL rate with a 1 ms delay from the modem of the UE to the eNB, and a 100 Mbps link with a 1 ms delay between the modem and the TCP layer of the UE. As shown in FIG. 3 and FIG. 4, even with no implemented packet flow control, an increased buffer size results in an increase in the UL rate $R_U$ and a decrease in the DL rate $R_D$. Further increasing the UL buffer size beyond a certain size results in an insignificant increase in the UL rate $R_U$ and a significant decrease in the DL rate $R_D$. Increasing the UL buffer size causes an increase in the RTT and the ACK compression, resulting in a greater number of DL packets being dropped. Accordingly, there is an optimum UL buffer size based on a desired DL rate $R_D$ and UL rate $R_U$.

Figure 5:
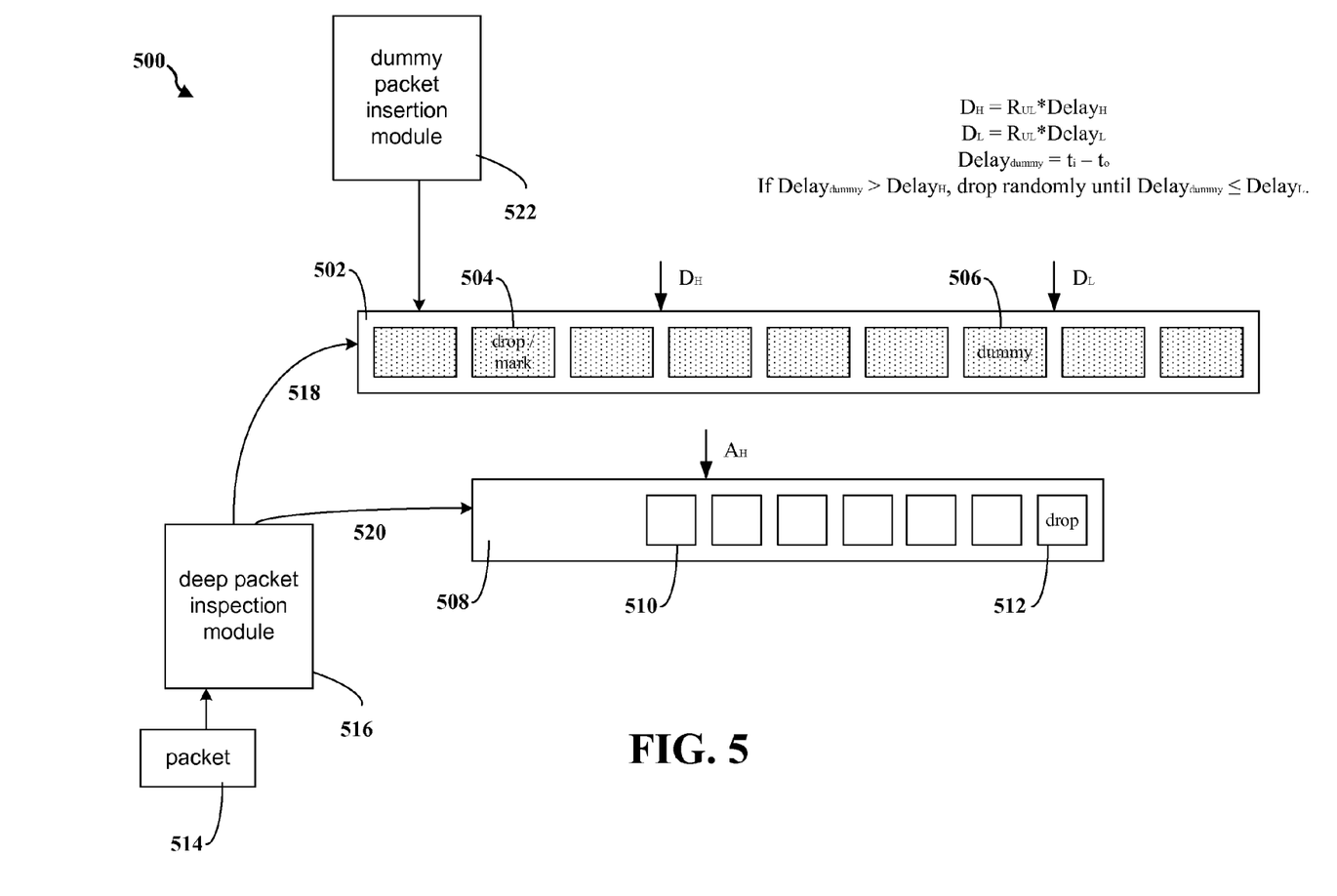
FIG. 5 is a diagram for illustrating an exemplary method for TCP packet flow control.

FIG. 5 is a diagram 500 for illustrating an exemplary method for TCP packet flow control. As shown in FIG. 5, incoming packets 514 may be inspected by a deep packet inspection module 516 and separated into either the data buffer 502 (518) or the ACK buffer 508 (520). In one configuration, the deep packet inspection module 516 may only inspect packets that are less than X bytes (e.g., X=80). In such a configuration, packets that are greater than or equal to X bytes may be placed automatically in the data buffer 502. For packets that are less than X bytes, the deep packet inspection module 516 stores 518 the data packets into the data buffer 502 and stores 520 the ACK packets into the ACK buffer 508. The deep packet inspection module may be enabled/disabled. Further, the size range of the packets for which the deep packet inspection module 516 inspects may be changed (i.e., X may be varied).

The dummy packet insertion module 522 may periodically insert a dummy packet 506 with a time stamp of an initial time (or time in) $t_i$. When the dummy packet 506 is removed from the queue, a final time (or time out) $t_o$ is compared to the initial time $t_i$. The difference $t_i-t_o$ is the delay $Delay_{dummy}$ of the dummy packet 506 in the buffer. After the dummy packet 506 is de-queued from the data buffer 502, the dummy packet 506 is not transmitted to the serving eNB and is discarded. According to the exemplary method, if the delay $Delay_{dummy}$ is greater than an upper (high) delay threshold $Delay_U$ (e.g., 60-80 ms), the UE starts randomly dropping or marking data packets 504 until the delay $Delay_{dummy}$ is less than or equal to a lower (low) delay threshold $Delay_L$ (e.g., 30 ms). The delay threshold $Delay_U$ is related to a high buffer storage threshold $D_H$ through the relationship $D_H=R_{UL}Delay_U$, where $D_H$ is the high buffer storage threshold and $R_{UL}$ is the UL transmission rate. The delay threshold $Delay_L$ is related to a low buffer storage threshold $D_L$ through the relationship $D_L=R_{UL}Delay_L$, where $D_L$ is the low buffer storage threshold and $R_{UL}$ is the UL transmission rate. The high and low buffer storage thresholds $D_H$ and $D_L$ are indicated in FIG. 5. Because the UL transmission rate $R_{UL}$ varies, the high and low buffer storage thresholds $D_H$ and $D_L$ also vary.

When the UE drops an UL data packet, the TCP source/server realizes that the network is congested, and slows down the DL data packet transmission rate. The decreased DL transmission rate results in a slowdown of the generation of UL data packets in the UE for UL transmission, and therefore reduces the amount of UL data packets stored in the data buffer 502. When the UE drops an UL data packet, the UE will have to re-buffer the data packet for later UL transmission (from the TCP layer perspective, when a UE drops an UL data packet, the data packet will have to be retransmitted). Alternatively, if the TCP source/server supports Explicit Congestion Notification (ECN), the UE may mark an IP header in a data packet to indicate network congestion. The advantage to marking packets rather than dropping is that the UE will not need to re-buffer a dropped data packet for later UL transmission.

The UE may also indicate network congestion by dropping an ACK when the number of ACKs is greater than a threshold or a size of the ACKs stored in the ACK buffer 508 is greater than a threshold $A_H$. When the UE determines to drop an ACK, the UE may drop the ACK from the earliest stored ACKs upon determining that another ACK may be transmitted that contains information of the dropped ACK. When the TCP source/server receives an ACK that contains information of a dropped ACK, the TCP source/server will recognize that the ACK also provides an acknowledgement of the dropped ACK. With respect to the threshold $A_H$, when the size of the ACKs stored in the ACK buffer 508 is greater than $A_H$, the UE may drop the ACK 512 upon determining that the ACK 510 contains information of the ACK 512.

In the exemplary method, the UE performs active queue management by dropping/marking data packets based on data packet delay in the data buffer 502. The UE may perform deep packet inspection to separate a subset of the packets (e.g., packets with size less than X) into different buffers. The deep packet inspection may be enabled/disabled. In addition, the UE may prioritize the transmission of ACKs on the UL by transmitting ACKs before data packets.

Figure 6:
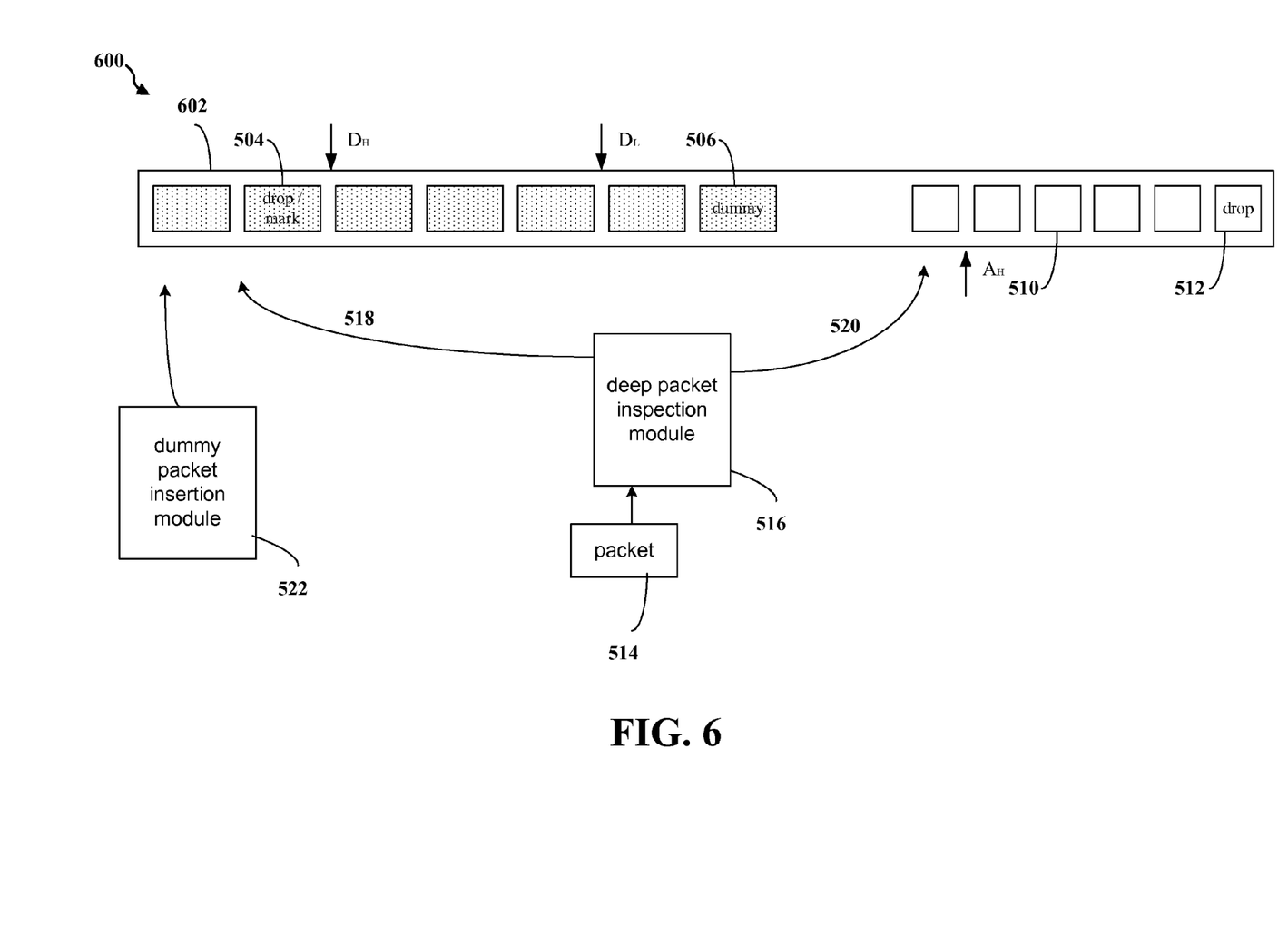
FIG. 6 is another diagram for illustrating an exemplary method for TCP packet flow control.

FIG. 6 is another diagram 600 for illustrating an exemplary method for TCP packet flow control. As shown in FIG. 6, alternatively, the exemplary method may be performed in one buffer 602. The UE may hold pointers to the beginning and the end of the data and ACK portions of the buffer 602 to enable the exemplary method with one buffer.

Figure 7:
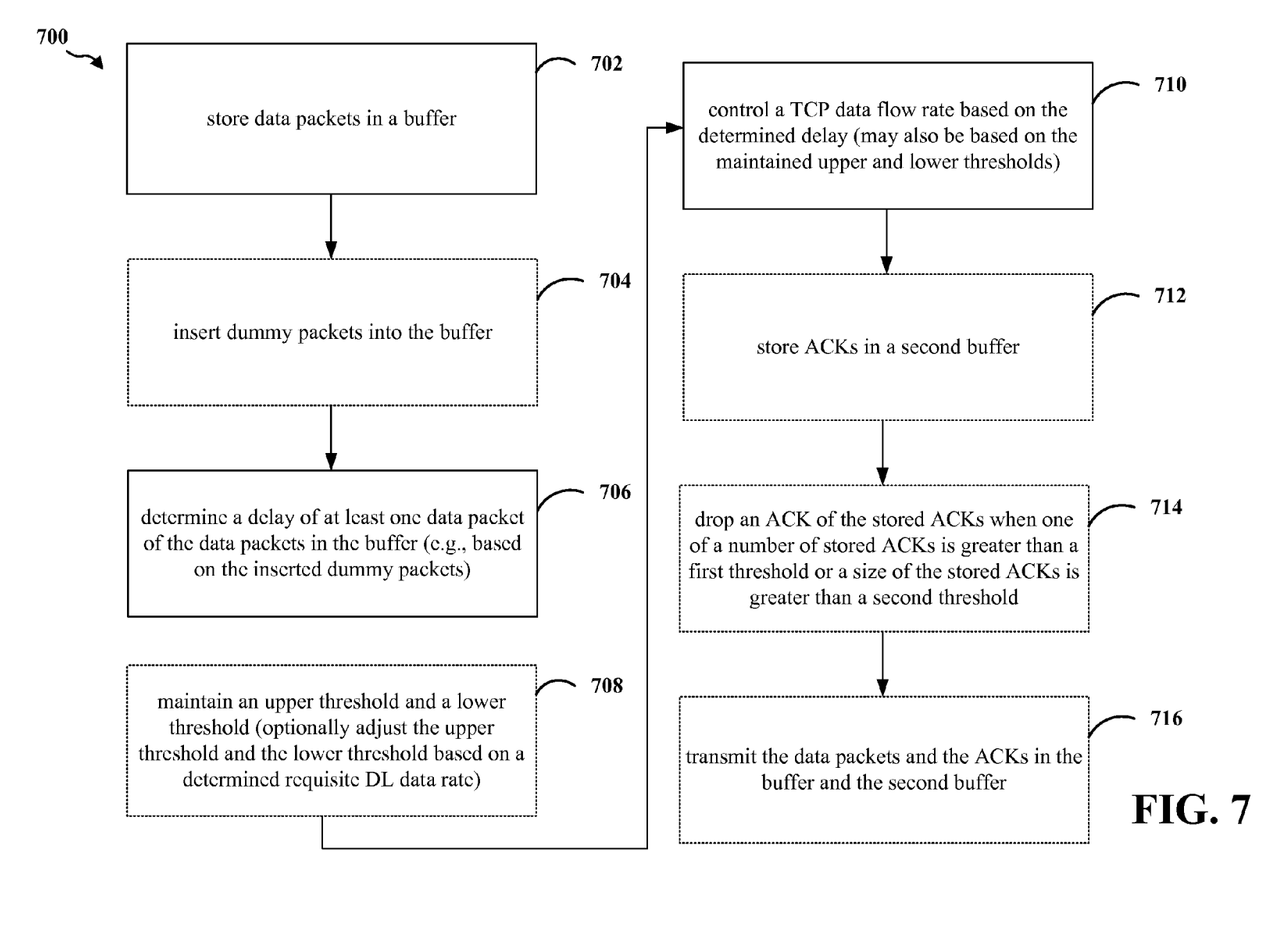
FIG. 7 is a flow chart of a method of wireless communication.

FIG. 7 is a flow chart 700 of a method of wireless communication. The method may be performed by a UE. In step 702, the UE stores data packets in a buffer. In step 704, the UE may also insert dummy packets into the buffer in order to determine a delay of packets inserted into the buffer. In step 706, the UE determines a delay of at least one data packet of the data packets in the buffer. If step 704 is performed, the delay may be determined based on the inserted dummy packets, such as through a comparison of the time at which the dummy packets are added to the buffer and the time at which the dummy packets are removed from the buffer. In step 708, the UE may maintain (i.e., store, adjust through increasing/decreasing) an upper delay threshold and a lower delay threshold. The UE may adjust the upper and lower delay thresholds based on a requisite DL data rate. For example, referring to FIG. 3 and FIG. 4, a decrease in a requisite DL data rate will allow the UL buffer size to be larger, and therefore the upper and lower delay thresholds may be increased. Further, an increase in a requisite DL data rate will require the UL buffer size to be smaller, and therefore the upper and lower delay thresholds may be decreased.

In step 710, the UE controls a TCP data flow rate based on the determined delay. If step 708 is performed, the UE may also control the TCP data flow rate based on the upper and lower delay thresholds. For example, the UE may decrease the TCP data flow rate by dropping or marking packets when the delay is greater than or equal to the upper delay threshold, and may continue dropping or marking packets until the delay is less than or equal to the lower delay threshold. When the UE decreases the TCP data flow rate by dropping or marking packets, the UE may select which packets to drop/mark randomly. For example, the UE may randomly select one packet out of every ten packets for marking/dropping.

In step 712, the UE may store ACKs in a second buffer. The buffer and the second buffer may be the same buffer (see FIG. 6) or different buffers (see FIG. 5). The second buffer may be multiple buffers. For example, ACKs from each TCP stream may be stored in a separate buffer. In step 714, the UE may drop an ACK of the stored ACKs when one of a number of stored ACKs is greater than a first threshold or a size of the stored ACKs is greater than a second threshold. The UE may drop the ACK from the earliest stored ACKs upon determining that another ACK may be transmitted that contains information of the dropped ACK. In step 716, the UE transmits the data packets and the ACKs in the buffer. The UE may transmit the data packets and the ACKs with a varying UL transmission rate.

Figure 8:
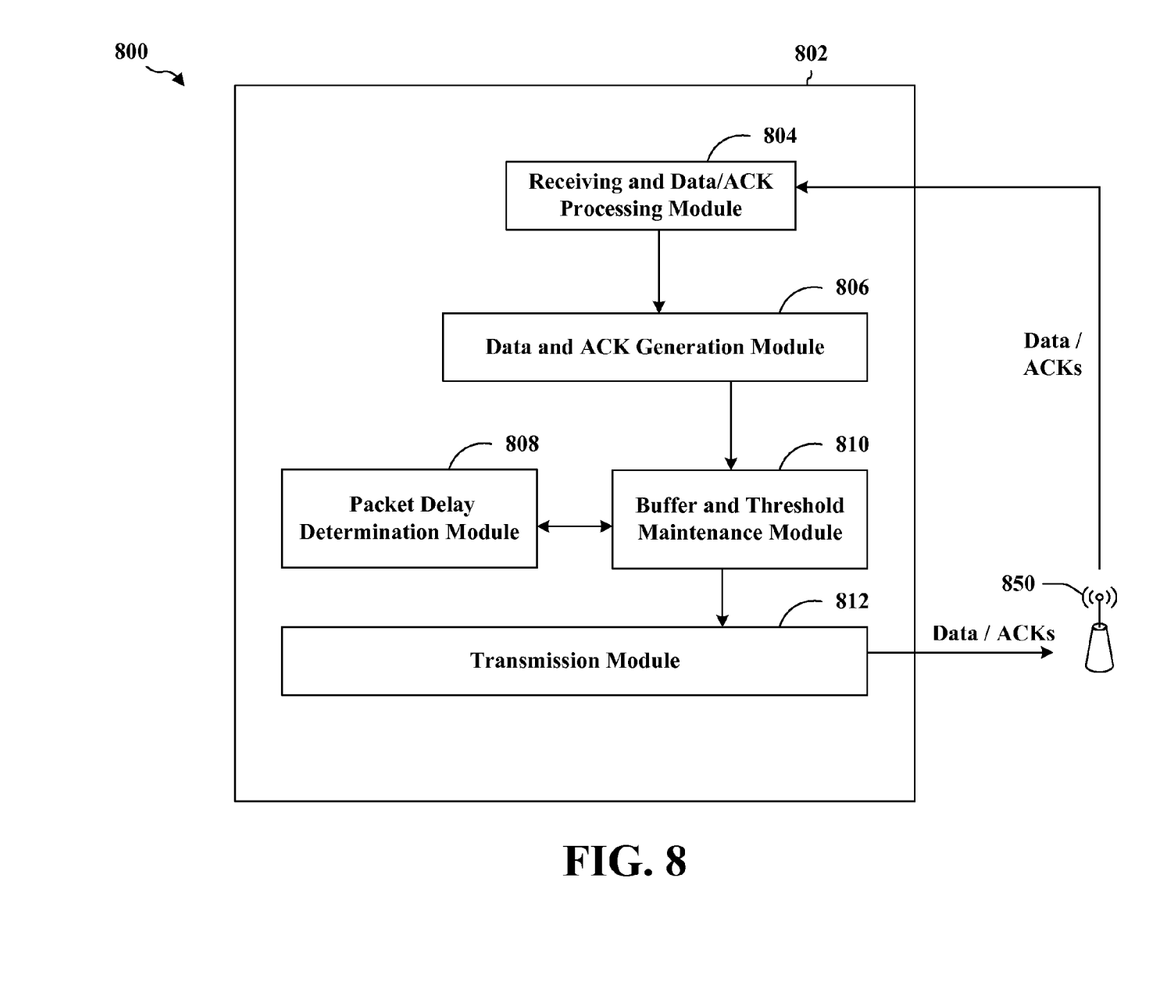
FIG. 8 is a conceptual data flow diagram illustrating the data flow between different modules/means/components in an exemplary apparatus.

FIG. 8 is a conceptual data flow diagram 800 illustrating the data flow between different modules/means/components in an exemplary apparatus 802. The apparatus includes a receiving and data/ACK processing module 804 that receives data and/or ACKs from an eNB 850. The apparatus further includes a data and ACK generation module 806. The data and ACK generation module 806 may generate an ACK based on received data. The data and ACK generation module 806 may also generate data based on received data or a received ACK. The data and ACK generation module 806 provides generated data/ACKs to the buffer and threshold maintenance module 810. The buffer and threshold maintenance module 810 stores the data/ACKs into the buffer(s). The buffer and threshold maintenance module 810 may maintain one or more buffers for storing the data and ACKs. When the buffer and threshold maintenance module 810 cannot determine whether a packet carries data or an ACK based on the size of the packet, the buffer and threshold maintenance module 810 may perform deep packet inspection to separate data and ACKs into their respective buffers. The apparatus may further include a packet delay determination module 808. When a dummy packet is de-queued, the buffer and threshold maintenance module 810 may provide the dummy packet to the packet delay determination module 808 so that the packet delay determination module can determine for how long the dummy packet was queued in the buffer. The packet delay determination module 808 provides the delay information to the buffer and threshold maintenance module 810 so that the buffer and threshold maintenance module 810 may maintain the upper and lower delay thresholds associated with the buffer(s). The buffer and threshold maintenance module 810 provides de-queued data and ACK packets to the transmission module, which transmits the data and ACK packets to the eNB 850.

The apparatus may include additional modules that perform each of the steps of the algorithm in the aforementioned flow chart of FIG. 7. As such, each step in the aforementioned flow chart of FIG. 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
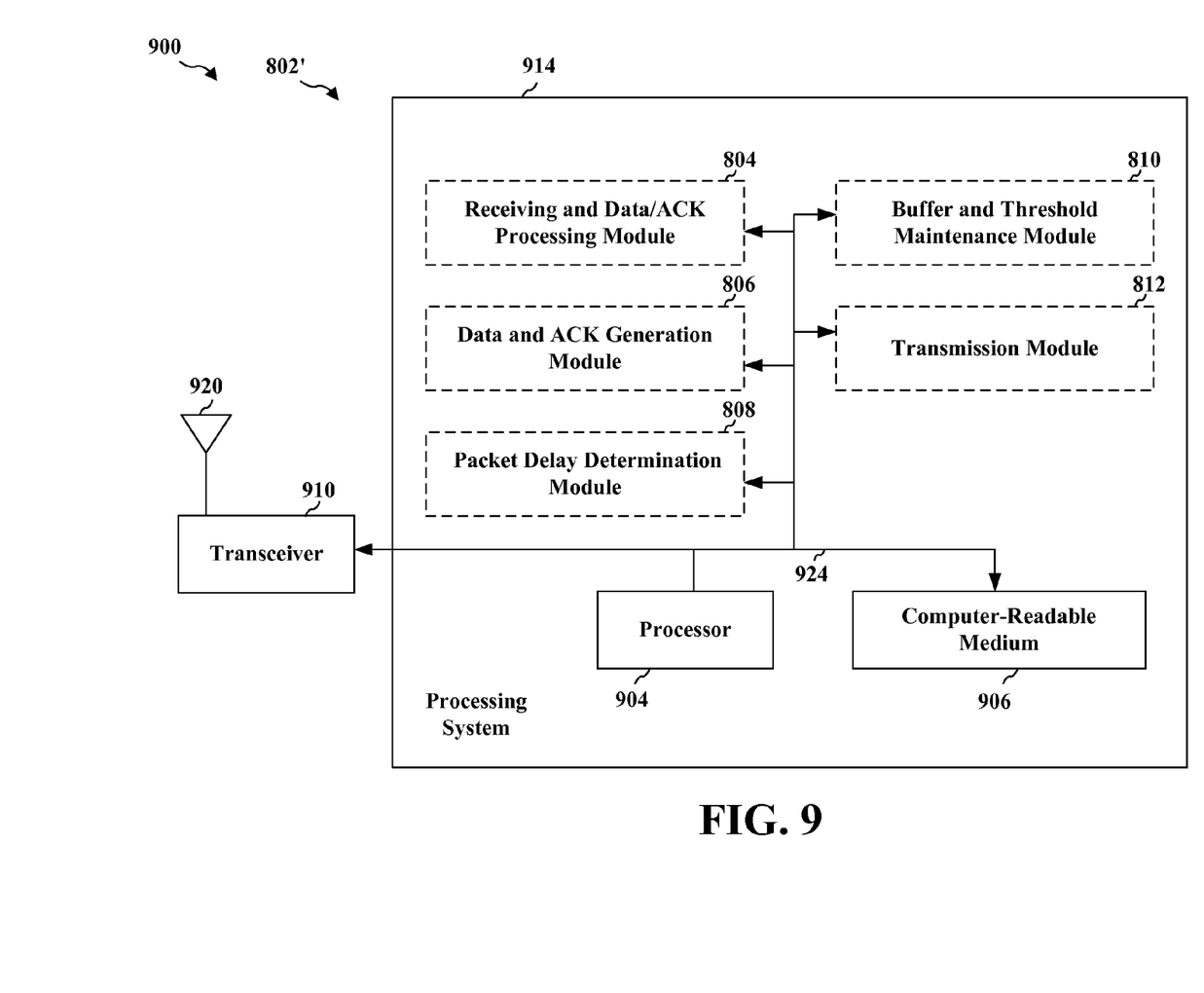
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 804, 806, 808, 810, 812 and the computer-readable medium 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium.

The processing system 914 includes a processor 904 coupled to a computer-readable medium 906. The processor 904 is responsible for general processing, including the execution of software stored on the computer-readable medium 906. The software, when executed by the processor 904, causes the processing system 914 to perform the various functions described supra for any particular apparatus. The computer-readable medium 906 may also be used for storing data that is manipulated by the processor 904 when executing software. The processing system further includes at least one of the modules 804, 806, 808, 810, and 812. The modules may be software modules running in the processor 904, resident/stored in the computer readable medium 906, one or more hardware modules coupled to the processor 904, or some combination thereof.

In one configuration, the apparatus 802/802' for wireless communication includes means for storing data packets in a buffer, means for determining a delay of at least one data packet of the data packets in the buffer, and means for controlling a TCP data flow rate based on the determined delay. The apparatus may further include means for maintaining an upper delay threshold. The means for maintaining the upper delay threshold stores an upper delay threshold and may increase or decrease the upper delay threshold based on a requisite DL data rate. The apparatus may further include means for maintaining a lower delay threshold. The means for maintaining the lower delay threshold stores a lower delay threshold and may increase or decrease the lower delay threshold based on a requisite DL data rate. The apparatus may further include means for determining a requisite DL data rate and means for adjusting the upper threshold and the lower threshold based on the determined requisite DL data rate. The apparatus may further include means for storing ACKs in a second buffer, and means for dropping an ACK of the stored ACKs when one of a number of stored ACKs is greater than a first threshold or a size of the stored ACKs is greater than a second threshold. The buffer and the second buffer may be the same buffer or different buffers. The apparatus may further include means for transmitting the data packets in the buffer with a varying uplink transmission rate. The apparatus may further include means for inserting dummy packets into the buffer. The delay may be determined based on the inserted dummy packets. The aforementioned means may be one or more of the aforementioned modules of the apparatus 802 and/or the processing system 914 of the apparatus 802' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   for each of a plurality of Transmission Control Protocol (TCP) packets to be transmitted on an uplink (UL), determining whether the TCP packet is an UL data packet or a downlink (DL) acknowledgement (ACK) acknowledging a DL data packet received on the downlink based on a size of the TCP packets, deep packet inspection, or both;
   storing the UL data packets in a first buffer portion in a mobile device, wherein the first buffer portion is allocated to store only the UL data packets;
   storing the DL ACKs in a second buffer portion in the mobile device, wherein the second buffer portion is allocated to store only the DL ACKs, and the second buffer portion does not overlap with the first buffer portion;
   determining a delay of a queue of stored UL data packets in the first buffer portion by measuring one or more parameters indicative of a delay of at least one stored UL data packet of the stored UL data packets in the first buffer portion, wherein the one or more parameters indicative of a delay of the at least one stored UL data packet include a time in and a time out of the queue;
   dropping or marking one or more stored UL data packets in the first buffer portion when the delay is greater than or equal to an upper delay threshold; and
   dropping one or more of the stored DL ACKs when a number of the stored DL ACKs exceeds a first threshold number of DL ACKs, or when a total size of the stored DL ACKs is greater than a second threshold number of bytes.

2. The method of claim 1, wherein the determining whether the TCP packet is the UL data packet or the DL ACK comprises:
   when the size of the TCP packets is greater than or equal to a first size, determining that the TCP packet is the UL data packet; and
   when the size of the TCP packet is less than the first size, using deep packet inspection to determine whether the TCP packet is the UL data packet or the DL ACK.

3. The method of claim 1, comprising:
   comparing the determined delay of the queue of stored UL data packets in the first buffer portion with a lower delay threshold; and
   wherein the dropping or marking is performed until the delay is less than or equal to the lower delay threshold.

4. The method of claim 3, further comprising:
   determining a requisite downlink (DL) data rate; and
   adjusting the upper delay threshold or the lower delay threshold or both, based on the determined requisite DL data rate.

5. The method of claim 4, wherein the upper delay threshold or the lower delay threshold or both are decreased, corresponding to an increase in the determined requisite DL data rate, thereby allowing a size of the first buffer portion to decrease.

6. The method of claim 1, wherein the dropping or marking one or more stored UL data packets comprises randomly dropping one or more stored UL data packets to remove the one or more stored UL data packets from the first buffer portion.

7. The method of claim 1, wherein the dropping or marking one or more stored UL data packets comprises randomly marking one or more stored UL data packets to indicate network congestion.

8. The method of claim 1, wherein the first buffer portion and the second buffer portion are located in different buffers.

9. The method of claim 1, wherein dropping one or more of the stored DL ACKs when a number of the stored DL ACKs exceeds a first threshold number of DL ACKs, or when a total size of the stored DL ACKs is greater than a second threshold number of bytes comprises dropping a DL ACK that is the earliest stored DL ACK whose information is determined to be contained in another stored DL ACK for transmission.

10. The method of claim 1, further comprising transmitting the stored UL data packets from the queue of stored UL data packets in the first buffer portion with a variable uplink transmission rate.

11. The method of claim 1, wherein the at least one stored UL data packet includes at least one inserted dummy packet, and wherein the time in is a time the dummy packet is inserted into the queue and wherein the time out is a time the dummy packet is de-queued.

12. The method of claim 11, wherein the determining the delay comprises:
time-stamping the inserted dummy packet with the time in; and
calculating the delay based on a difference between the time out and the time in.

13. An apparatus for wireless communication, comprising:
means for, for each of a plurality of Transmission Control Protocol (TCP) packets to be transmitted on an uplink (UL), determining whether the TCP packet is an UL data packet or a downlink (DL) acknowledgement (ACK) acknowledging a DL data packet received on the downlink based on a size of the TCP packets, deep packet inspection, or both;
means for storing the UL data packets in a first buffer portion in a mobile device wherein the first buffer portion is allocated to store only the UL data packets;
means for storing the DL ACKs in a second buffer portion in the mobile device, wherein the second buffer portion is allocated to store only the DL ACKs, and the second buffer portion does not overlap with the first buffer portion;
means for determining a delay of a queue of stored UL data packets in the first buffer portion by measuring one or more parameters indicative of a delay of at least one stored UL data packet of the stored UL data packets in the first buffer portion, wherein the one or more parameters indicative of a delay of the at least one stored UL data packet include a time in and a time out of the queue;
means for dropping or marking one or more stored UL data packets in the first buffer portion when the delay is greater than or equal to an upper delay threshold; and
means for dropping one or more of the stored DL ACKs when a number of the stored DL ACKs exceeds a first threshold number of DL AKCs, or when a total size of the stored DL ACKs is greater than a second threshold number of bytes.

14. The apparatus of claim 13, wherein the means for determining whether the TCP packet is the UL data packet or the DL ACK comprises:

means for, when the size of the TCP packets is greater than or equal to a first size, determining that the TCP packet is the UL data packet; and
means for, when the size of the TCP packet is less than the first size, using deep packet inspection to determine whether the TCP packet is the UL data packet or the DL ACK.

15. The apparatus of claim 13, further comprising:
means for comparing the delay of the queue of stored UL data packets in the first buffer portion with a lower delay threshold; and
wherein the means for dropping or marking is configured to perform until the delay is less than or equal to the lower delay threshold.

16. The apparatus of claim 15, further comprising:
means for determining a requisite downlink (DL) data rate; and
means for adjusting the upper delay threshold or the lower delay threshold or both, based on the determined requisite DL data rate.

17. The apparatus of claim 16, wherein the upper delay threshold or the lower delay threshold or both are decreased, corresponding to an increase in the determined requisite DL data rate, thereby allowing a size of the first buffer portion to decrease.

18. The apparatus of claim 13, wherein the means for dropping or marking one or more stored UL data packets is configured to randomly drop one or more stored UL data packets to remove the one or more stored UL data packets from the first buffer portion.

19. The apparatus of claim 13, wherein the means for dropping or marking one or more stored UL data packets is configured to randomly mark one or more stored UL data packets to indicate network congestion.

20. The apparatus of claim 13, wherein the first buffer portion and the second buffer portion are located in different buffers.

21. The apparatus of claim 13, wherein dropping one or more of the stored DL ACKs when a number of the stored DL ACKs exceeds a first threshold number of DL ACKs, or when a total size of the stored DL ACKs is greater than a second threshold number of bytes comprises dropping a DL ACK that is the earliest stored DL ACK whose information is determined to be contained in another stored DL ACK for transmission.

22. The apparatus of claim 13, further comprising means for transmitting the stored UL data packets from the queue of stored UL data packets in the first buffer portion with a variable uplink transmission rate.

23. The apparatus of claim 13, wherein the at least one stored UL data packet includes at least one inserted dummy packet, and wherein the time in is the time the dummy packet is inserted into the queue and wherein the time out is the time the dummy packet is de-queued.

24. The apparatus of claim 23, wherein the means for determining the delay comprises:
means for time-stamping the inserted dummy packet with the time in; and
means for calculating the delay based on a difference between the time out and the time in.

25. An apparatus for wireless communication, comprising:
a processing system, the processing system comprising a processor and at least one buffer including a first buffer portion and a second buffer portion separate from the first buffer portion, the processing system configured to:
for each of a plurality of Transmission Control Protocol (TCP) packets to be transmitted on an uplink (UL), determine whether the TCP packet is an UL data packet or a downlink (DL) acknowledgement (ACK) acknowledging a DL data packet received on the downlink based on a size of the TCP packets, deep packet inspection, or both;

store the UL data packets in a first buffer portion in a mobile device, wherein the first buffer portion is allocated to store only the UL data packets;

store the DL ACKs in the second buffer portion in the mobile device, wherein the second buffer portion is allocated to store only the DL ACKs, and the second buffer portion does not overlap with the first buffer portion;

determine a delay of a queue of stored UL data packets in the first buffer portion by measuring one or more parameters indicative of the delay of at least one stored UL data packet of the stored UL data packets in the first buffer portion, wherein the one or more parameters indicative of a delay of the at least one stored UL data packet include a time in and a time out of the queue;

drop or mark one or more stored UL data packets in the first buffer portion when the delay is greater than or equal to an upper delay threshold; and drop one or more of the stored DL ACKs when a number of the stored DL ACKs exceeds a first threshold number of DL ACKs, or when a total size of the stored DL ACKs is greater than a second threshold number of bytes; and a transceiver configured to transmit the stored UL data packets and the stored DL ACKs.

26. The apparatus of claim 25, wherein the processing system is configured to determine whether the TCP packet is the UL data packet or the DL ACK by:

when the size of the TCP packets is greater than or equal to a first size, determining that the TCP packet is the UL data packet; and when the size of the TCP packet is less than the first size, using deep packet inspection to determine whether the TCP packet is the UL data packet or the DL ACK.

27. The apparatus of claim 25, wherein the processing system is further configured to:

compare the determined delay of the queue of stored UL data packets in the first buffer portion with a lower delay threshold; and wherein the dropping or marking is performed until the delay is less than or equal to the lower delay threshold.

28. The apparatus of claim 27, wherein the processing system is further configured to:

determine a requisite downlink (DL) data rate; and adjust the upper delay threshold or the lower delay threshold or both, based on the determined requisite DL data rate.

29. The apparatus of claim 28, wherein the upper delay threshold or the lower delay threshold or both are decreased, corresponding to an increase in the determined requisite DL data rate, thereby allowing a size of the first buffer portion to decrease.

30. The apparatus of claim 25, wherein the processing system is configured to drop or mark one or more stored UL data packets by randomly dropping one or more stored UL data packets to remove the one or more stored UL data packets from the first buffer portion.

31. The apparatus of claim 25, wherein the processing system is configured to drop or mark one or more stored UL data packets by randomly marking one or more data packets to indicate network congestion.

32. The apparatus of claim 25, wherein the first buffer portion and the second buffer portion are located in different buffers of the at least one buffer.

33. The apparatus of claim 25, wherein dropping one or more of the stored DL ACKs when a number of the stored DL ACKs exceeds a first threshold number of DL ACKs, or when a total size of the stored DL ACKs is greater than a second threshold number of bytes comprises dropping a DL ACK that is the earliest stored DL ACK whose information is determined to be contained in another stored DL ACK for transmission.

34. The apparatus of claim 25, wherein the processing system is further configured to transmit the stored UL data packets from the queue of stored UL data packets in the first buffer portion with a variable uplink transmission rate.

35. The apparatus of claim 25, wherein the at least one stored UL data packet includes at least one inserted dummy packet, and wherein the time in is the time the dummy packet is inserted into the queue and wherein the time out is the time the dummy packet is de-queued.

36. The apparatus of claim 35, wherein the processing system is further configured to determine the delay by:

time-stamping the inserted dummy packet with the time in; and calculating the delay based on a difference between the time out and the time in.

37. A computer program product, comprising:

a non-transitory computer-readable medium comprising code for:

for each of a plurality of Transmission Control Protocol (TCP) packets to be transmitted on an uplink (UL), determining whether the TCP packet is an UL data packet or a downlink (DL) acknowledgement (ACK) acknowledging a DL data packet received on the downlink based on a size of the TCP packets, deep packet inspection, or both;

storing the UL data packets in a first buffer portion in a mobile device, wherein the first buffer portion is allocated to store only the UL data packets;

storing the DL ACKs in a second buffer portion in the mobile device, wherein the second buffer portion is allocated to store only the DL ACKs, and the second buffer portion does not overlap with the first buffer portion;

determining a delay of a queue of stored UL data packets in the first buffer portion by measuring one or more parameters indicative of a delay of at least one stored UL data packet of the stored UL data packets in the first buffer portion, wherein the one or more parameters indicative of a delay of the at least one stored UL data packet include a time in and a time out of the queue;

dropping or marking one or more stored UL data packets in the first buffer portion when the delay is greater than or equal to an upper delay threshold; and dropping one or more of the stored DL ACKs when a number of the stored DL ACKs exceeds a first threshold number of DL ACKs, or when a total size of the stored DL ACKs is greater than a second threshold number of bytes.

38. The computer program product of claim 37, wherein the computer executable code for determining whether the TCP packet is the UL data packet or the DL ACK further comprises computer executable code for:

when the size of the TCP packets is greater than or equal to a first size, determining that the TCP packet is the UL data packet; and when the size of the TCP packet is less than the first size, using deep packet inspection to determine whether the TCP packet is the UL data packet or the DL ACK.

39. The computer program product of claim 37, wherein the non-transitory computer-readable medium further comprises computer executable code for:
comparing the determined delay of the queue of stored UL data packets in the first buffer portion with a lower delay threshold; and
wherein the dropping or marking is performed until the delay is less than or equal to the lower delay threshold.

40. The computer program product of claim 39, wherein the computer-readable non-transitory medium further comprises code for:
determining a requisite downlink (DL) data rate; and
adjusting the upper delay threshold or the lower delay threshold or both, based on the determined requisite DL data rate.

41. The computer program product of claim 40, wherein the upper delay threshold or the lower delay threshold or both are decreased, corresponding to an increase in the determined requisite DL data rate, thereby allowing a size of the first buffer portion to decrease.

42. The computer program product of claim 37, wherein the computer executable code for dropping or marking one or more stored UL data packets further comprises computer executable code for randomly dropping one or more stored UL data packets to remove the one or more stored UL data packets from the first buffer portion.

43. The computer program product of claim 37, wherein the computer executable code for dropping or marking one or more stored UL data packets further comprises computer executable code for randomly marking one or more data packets to indicate network congestion.

44. The computer program product of claim 37, wherein the first buffer portion and the second buffer portion are located in different buffers.

45. The computer program product of claim 44, wherein the computer executable code for dropping one or more of the stored DL ACKs when a number of the stored DL ACKs exceeds a first threshold number of DL ACKs, or when a total size of the stored DL ACKs is greater than a second threshold number of bytes comprises dropping a DL ACK that is the earliest stored DL ACK whose information is determined to be contained in another stored DL ACK for transmission.

46. The computer program product of claim 37, wherein non-transitory the computer-readable medium further comprises computer executable code for transmitting the stored UL data packets from the queue of stored UL data packets in the first buffer portion with a variable uplink transmission rate.

47. The computer program product of claim 37, wherein the non-transitory computer-readable medium further comprises code for wherein the at least one stored UL data packet includes at least one inserted dummy packet, and wherein the time in is a time the dummy packet is inserted into the queue and wherein the time out is a time the dummy packet is de-queued.

48. The computer program product of claim 47, wherein the computer executable code for determining the delay further comprises computer executable code for:
time-stamping the inserted dummy packet with the time in; and
calculating the delay based on a difference between the time out and the time in.

* * * * *